Dec. 3, 1968     S. O. STANFIELD     3,414,288
DUAL PROPULSION TRICYCLE
Filed July 10, 1967
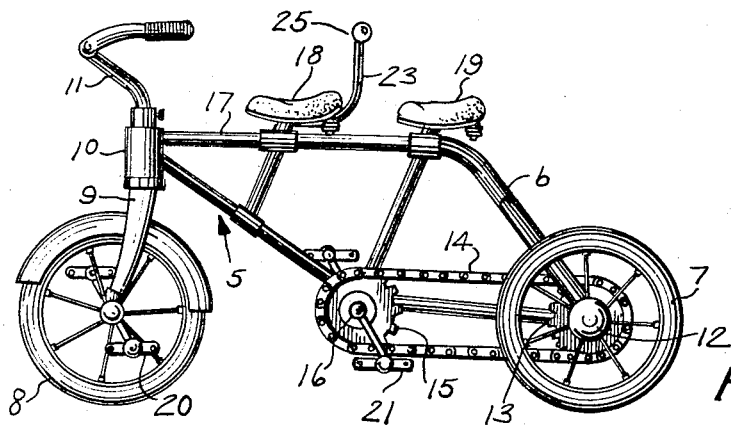
Fig. 1.
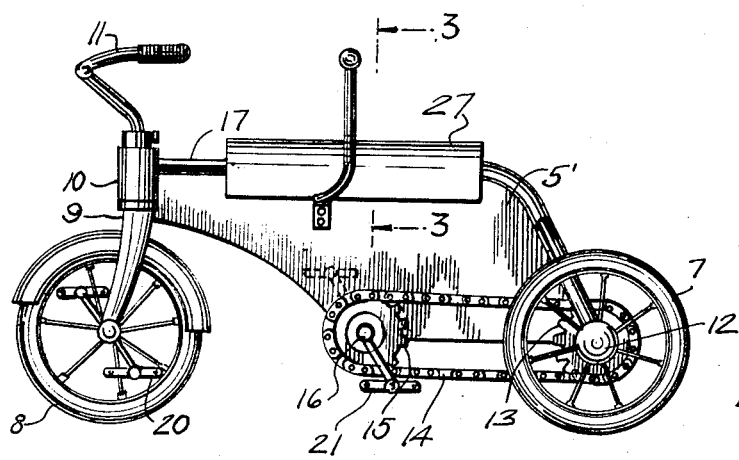
Fig. 2.
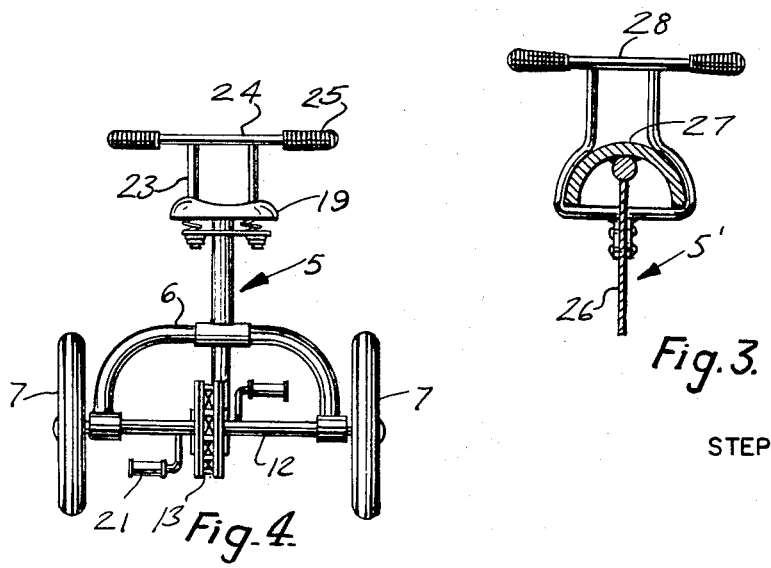
Fig. 3.
Fig. 4.
INVENTOR.
STEPHEN O. STANFIELD United States Patent Office 3,414,288
Patented Dec. 3, 1968

3,414,288
DUAL PROPULSION TRICYCLE
Stephen O. Stanfield, Arlington, Calif.
(Box 885, Star Route, Lytle Creek, Calif. 92358)
Filed July 10, 1967, Ser. No. 652,197
1 Claim. (Cl. 280—231)

ABSTRACT OF THE DISCLOSURE

A dual propulsion tricycle embodying a frame substantially similar to that of a bicycle except for the rear wheel mounting which is spread apart to provide bearings for a pair of laterally spaced rear wheels. The vehicle is propelled by two cyclists seated in tandem relation, the front rider manipulating the steering and front wheel drive which are conventional for a tricycle, the other rider adding to the propulsion through the conventional sprocket and chain drive of a bicycle; the front seat including in combination a back rest and, for the rear rider, a crossbar with suitable hand grips.

---

The present invention while relating to bicycles, tricycles and the like in general, has more particular reference to, and as its main objective the provision of, a new and novel tricycle propelled by two riders seated in tandem relation.

Another object of the invention is to employ a frame substantially similar to the conventional frame of a bicycle except for the rear suspension which is spread apart to accommodate a pair of laterally spaced rear wheels.

A further object of the invention is the provision of a combination saddle and back rest for the front rider and a non-steering handle bar for the rear rider.

Still another object of the invention is to provide a tricycle of the character described whereby steering of the vehicle is by handle bar under control of the front rider while a fixed, second handle bar is used by the rear seat rider as an aid in mounting, dismounting and maintaining balance.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit and scope of the invention as set forth in the specification and particularly defined in the appended claims.

In the drawing:

FIGURE 1 is a side elevation of a preferred embodiment of the invention;

FIGURE 2 is a view similar to FIGURE 1 but illustrating a modified form of frame construction;

FIGURE 3 is a sectional detail on line 3—3 of FIGURE 2 looking in the direction of the arrows;

FIGURE 4 is an end view as seen from the right of the tricycle shown in FIGURE 1, the back rest for the front seat rider being omitted for the purpose of clarity.

In the drawing similar reference numerals designate similar parts through the different views.

Referring first to FIGURES 1 and 4, numeral 5 represents in general the tricycle frame. This frame 5 it will be observed is of tubular material and substantially similar in design and construction to that of the conventional bicycle with the following exceptions: The rear brace member 6 is spread apart to provide bearings for a pair of laterally spaced rear wheels 7 which are preferably of like diameter as the front wheel 8. Wheel 8 has the usual ballbearing in the lower end of fork member 9 fixed to a steering post, not shown, rotatable in the head member 10 of frame 5, the customary handle bar 11 being fixedly secured to the upper end of the said post.

The rear wheels 7 are mounted on a ballbearing, not shown in the frame member 6 and carried by the rotatable rear axle 12 to which is keyed a sprocket 13 driven by sprocket chain 14 geared to a driving sprocket 15 on a stub shaft 16 rotatable in suitable bearings at a point in the frame 5 intermediate the front and rear wheels.

On a top longitudinally extending bar 17 of frame 5 are seats 18 and 19 in the form of saddles arranged in tandem. A rider on the front seat propels the front wheel 8 by means of a pair of diametrically opposed foot pedals 20 carried by such wheel while the rear wheels 7 are propelled through the medium of the chain and sprocket gearing by a like pair of foot pedals 21 carried by the stub shaft 16 and manipulated by the rider on rear seat 19.

Integral with the front seat 18 is a back rest 23 to which is fixed a crossbar 24 provided with hand grips 25. The member 24 provides a handle bar for the rear seat rider and a means for maintaining proper balance. Likewise the front seat rider maintains balance by gripping the handle bars 11 and at the same time steers the vehicle.

With reference to FIGURES 2 and 3 it will be observed that the tricycle frame 5' comprises a peripherally reinforced vertically disposed body 26 of sheet material, the two seats being the front and rear portions, respectively, of an elongated longitudinally extending saddle 27, the combined back rest and rear handle bar 28 being secured directly to the frame body 26.

While a tricycle embodying the instant invention is intended primarily for children, it will be observed that the structural features thereof are such as to adapt it to adult use.

What I claim is:

1. In a dual propulsion tricycle, the combination of a frame, a front wheel, a pair of laterally spaced apart rear wheels, steering means and front wheel propelling means manipulated by a rider comprising a front rider thereof, additional propelling means including a sprocket and a chain drive for said rear wheels manipulated by a rear rider thereof, said front wheel propelling means comprising a pair of diametrically opposed foot pedals on said wheel, an axle for said rear wheels, a stub shaft intermediate said front and rear wheels rotatably mounted on said frame, a second pair of diametrically opposed foot pedals fixed to said shaft, said sprocket and chain drive comprising the driving connection between said pedal driven shaft and said rear axle, said frame comprising a peripherally reinforced vertically disposed body of sheet material, a single member comprised of a longitudinally extending saddle straddling said frame, said single member providing two seat portions, one of said seat portions comprising a front seat portion and the other a rear seat portion divided by the provision of a handlebar for said rear rider on said rear seat portion, said handle bar being rigidly attached to said frame body and providing a backrest for said front rider on said front seat portion.

References Cited

UNITED STATES PATENTS

| | | | |
|---|---|---|---|
| 558,856 | 4/1896 | Staats | 280—231 |
| 629,401 | 7/1899 | Smyser | 280—274 |
| 1,109,424 | 9/1914 | Kiefer | 280—273 X |
| 1,524,552 | 1/1925 | Hudry | 280—282 |
| 2,715,342 | 8/1955 | Ridgway | 280—231 X |
| 3,132,872 | 5/1964 | Pinsly | 280—273 X |

KENNETH H. BETTS, Primary Examiner.